United States Patent

Franzen

[15] 3,677,418

[45] July 18, 1972

[54] POWER OPERATED I-BEAM ROTATOR

[72] Inventor: Walter B. Franzen, Rockford, Ill.

[73] Assignee: W. A. Whitney Corp., Rockford, Ill.

[22] Filed: Aug. 3, 1970

[21] Appl. No.: 60,374

[52] U.S. Cl. .......................................................214/1 QC
[51] Int. Cl. ..............................................................B65g 7/00
[58] Field of Search ....................................214/1, 1 R, 1 RZ

[56] References Cited

UNITED STATES PATENTS

| 1,916,025 | 6/1933 | Skeehan | 214/1 RZ X |
| 2,338,285 | 1/1944 | Harry | 214/1 RZ |
| 3,127,661 | 4/1964 | McConnell | 214/1 RZ X |

*Primary Examiner*—Robert G. Sheridan
*Assistant Examiner*—Frank E. Werner
*Attorney*—Andrew F. Wintercorn

[57] ABSTRACT

This power operated I-beam turner has endless chain loops in which to cradle the beam carried in a plurality of coaxially spaced pulleys that are profiled circumferentially for meshing engagement with chains to enable transmitting drive thereto, all at the same speed in either direction for a beam turning operation. The pulley blocks can be hoisted and lowered relative to a roller conveyor system on which the beam is movable endwise when placed thereon by the chain loops, spaces being provided in this conveyor system in which the chains can operate when free of the beam. A pair of forked, spring operated spreader arms are provided on each pulley block pivoted at one end on the block and having chain guides in the other end slidably engaging both sides of the chain loop on the inner side to spread it enough when it is not cradling a beam so that it stays clear of the beam and won't interfere with its freedom of movement on the conveyor system while punching or other operations are being performed.

14 Claims, 7 Drawing Figures

Patented July 18, 1972
3,677,418
2 Sheets-Sheet 1
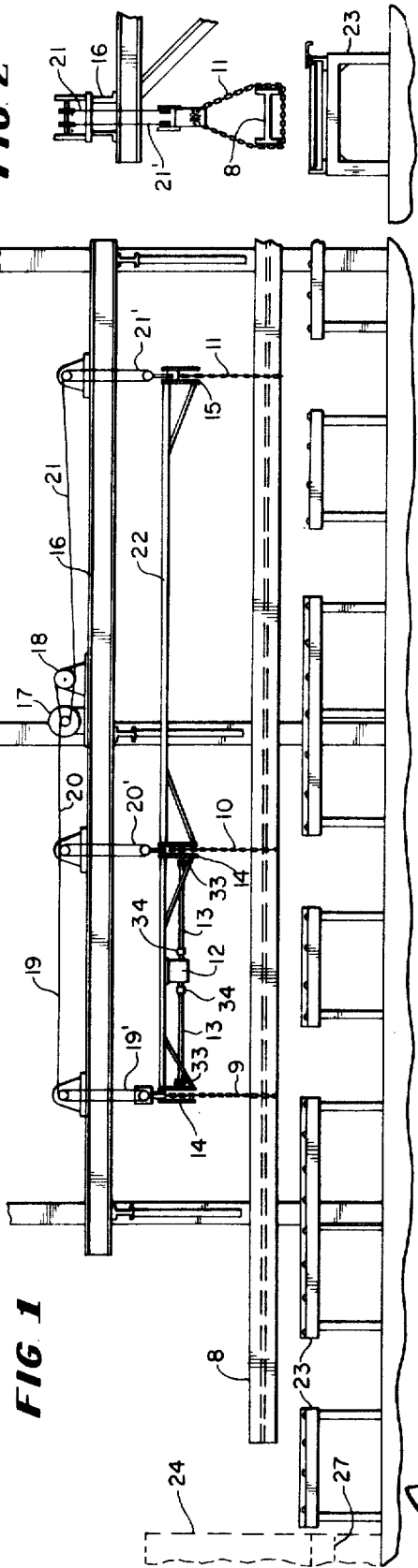
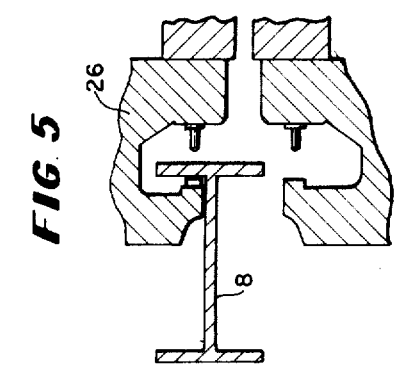
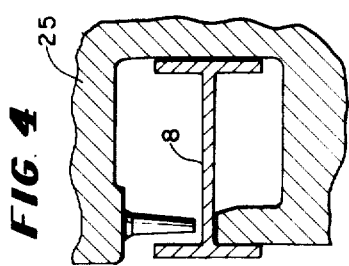
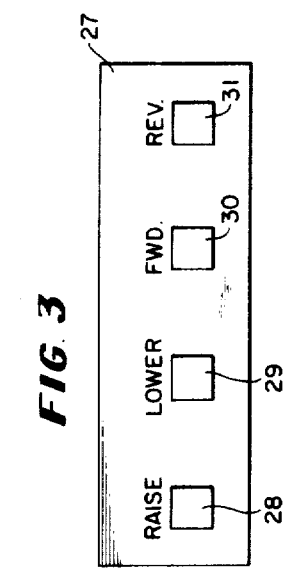
INVENTOR:
WALTER B. FRANZEN
ATTORNEY Patented July 18, 1972

INVENTOR.
WALTER B. FRANZEN

ATTORNEY 3,677,418

POWER OPERATED I-BEAM ROTATOR

This invention relates to a power-operated I-beam rotator.

The problem of rotating an I-beam to enable punching holes in both flanges or in opposite sides of the web can best be appreciated by calling attention to the fact that a 60-foot I-beam of a certain size, for example, weighs approximately 6 tons, and man-handling a load of that size can and has led to serious injuries to workmen, so the need for a power-operated beam rotator is obvious and has been recognized for some time. It is, therefore, the principal object of my invention to provide a practical and not too complicated nor expensive power-operated beam rotator.

The power-operated endless chains used for cradling an I-beam at several points along its length for rotation presents a problem in the forward and return passes of the I-beams endwise through these spaced chains in the punching of holes unless they are spread wide open when they are not under load, and it is, therefore, another important object of my invention to provide simple and practical means to that end in the form of spring-operated pairs of spreader arms, the sole function of which is to spread apart opposite sides of each endless chain under the action of springs that are strong enough to perform this spreading function but weak enough so as not to interfere in any way with the beam rotating function when these chains are under load cradling the I-beam therein. These spreaders are provided on powered units and idler units alike as, of course, the need for spreading the endless chains is the same in either case, and, while I have mentioned the beam rotators only in connection with the punching of holes in the webs and flanges it should, of course, be understood that these power-operated beam rotators can be used in other areas to substantially equal advantage, as, for example, in beam fabricating areas.

The invention is illustrated in the accompanying drawings, in which:

FIG. 1 is a fairly diagrammatic illustration of a powered beam rotator made in accordance with my invention shown in connection with conventional roller type conveyor means below and cable drums on the overhead framework connected through hoists with the intermediate frame for raising and lowering the beams so that after a turnover has been completed following one operation on the beam it can be lowered again onto the conveyor for the next operation;

FIG. 2 is an end view of FIG. 1;

FIG. 3 shows a four-button control panel, the first two buttons of which control the winch or winches for raising and lowering the I-beam and the other two buttons serving to control the power-operated beam rotator;

FIG. 4 and 5 are diagrammatic illustrations of a web press and two flange presses, respectively, a second pass of the beam being, of course, required after it has been turned over if the program sheet indicates the necessity for other holes in the web or holes to be punched in the other flange.

The same reference numerals are applied to corresponding parts throughout the views.

Figure 6:
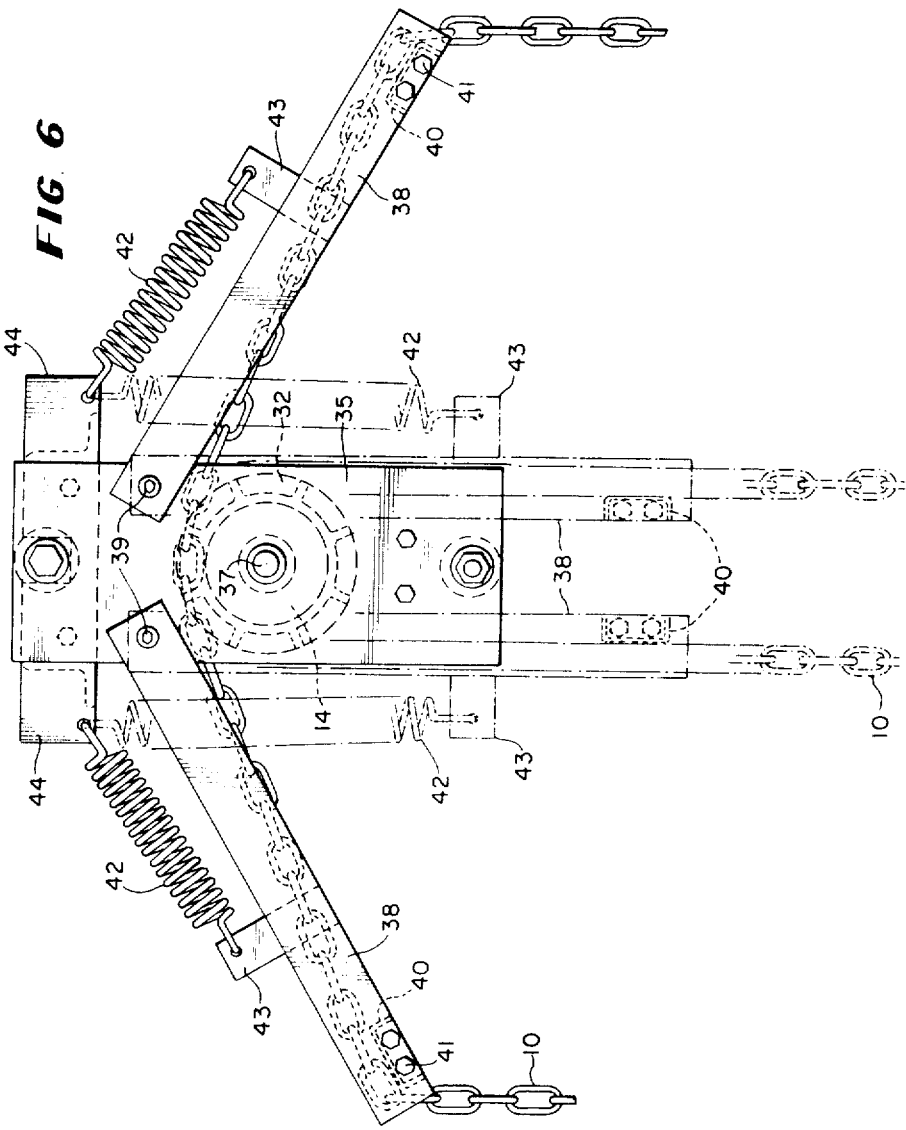
FIGS. 6 and 7 are a face view and a side view, respectively, of the spring-operated spreader arms.

Referring first to FIGS. 1 to 5, an I-beam is indicated at 8 cradled in three endless chain loops 9, 10, and 11, of which 9 and 10 are power-operated and 11 is a follower or idler, the means for power operation of chains 9 and 10 being indicated at 12 where a reversible electric gearmotor has shafts 13 connected to opposite sides thereof to drive the pulleys 14. 15 is an idler pulley identified with chain 11, the overhead framework 16 carries a reversible electric gearmotor 17 driving a drum 18 having cables 19, 20, and 21 wound thereon for joint operation for related hoists 19', 20', and 21' for raising and lowering the beam 8 by raising or lowering the intermediate frame 22 on which the chain loops 9, 10, and 11 are suspended. It will be noticed that the chain loops 9, 10, and 11 are disposed in vertical planes in the places between the sections of the system of roller conveyors indicated at 23, on which the I-beam 8 rests for rolling support when it is to be passed endwise relative to the tooling indicated in dotted lines at 24 disposed in a space between two section of the conveyor system 23. This tooling may be in the form of a web press like that illustrated diagrammatically at 25 in FIG. 4, or flange presses as illustrated diagrammatically at 26 in FIG. 5. In some cases a web press and two flange presses are located side by side in a wider space between adjoining sections of the conveyor system 23 and a control panel 27 is provided on the front of one of these presses, as indicated in FIG. 1, to permit the operator by pressing the button 28 to raise the beam 8 by forward operation of gearmotor 17, and lower the beam by depression of button 29 by reverse operation of gearmotor 17. He can also, while the beam 8 is elevated, cause it to be turned over in one direction by depression of button 30, causing forward operation of gearmotor 12, reverse operation of the gearmotor 12 to correct for overrun being obtained by pressing button 31. Hence, if the web of the I-beam 8, according to a program sheet, is to have holes punched therein across the depth of the beam at specified distances from the flange as illustrated, for example, in FIG. 4, it is a simple matter to punch holes across the depth of the beam 8 at several locations as far as the machine's depth capacity will permit, and after the beam 8 has made a complete pass through the machine, turn the beam over to make another pass through the machine to complete punching the line of holes in the web. Likewise if holes are punched in one flange of the I-beam, as shown in FIG. 5, that can be done in one pass, and, in the next pass, after the beam has been turned over, the same operation can be performed on the other flange. Where there is to be two sets of holes punched in the same flange, above and below the web, as illustrated in FIG. 5, hydraulic means (not shown) can be operated to shift the punch means up and down to permit both holes to be punched in one position of the beam.

Figure 7:
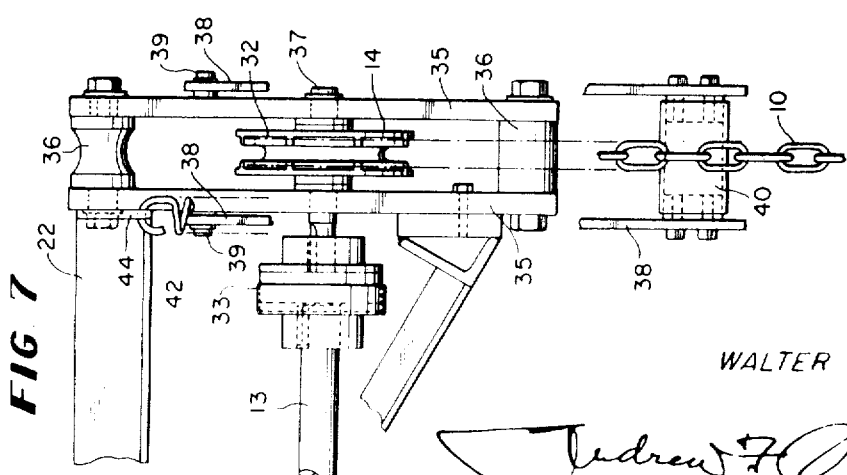

Referring next to FIGS. 6 and 7, in conjunction with FIGS. 1 and 2, it will be seen that the chain rollers or pulleys 14 and 15 have circumferencially spaced pockets 32 in the periphery thereof for meshing engagement therein of the links of the chain for positive driving of the chains 9 and 10 in either direction, accordingly as the shafts 13 are driven by the gearmotor 12, these shafts having flexible couplings 33 connecting the outer ends thereof with the chain rollers and the rigid couplings 34 connecting the inner ends of the shafts with opposite ends of the armature shaft of the gearmotor 12. Two plates 35 disposed in spaced parallel relationship with spacers 36 therebetween are bolted together to provide rigid support for the chain roller 32, the rollers having trunnions 37 received in bearing holes in the center of the plate 35. A pair of chain spreader arms 38 of bifurcated form are pivotally connected at 39 at one end to the plates 35 above the chain roller 14 and have channel shaped spacers 40 secured between the other ends of the arms 38, as indicated at 41, with their closed sides facing outwardly for easy sliding action on the inner side of the chain 10, so that when the chain is not under load, the I-beam 8 having been laid on the rollers of the conveyor system 23, the arms 38 under action of the coiled tension springs 42 will spread the endless chain 10 to the wide extent illustrated in full lines in FIG. 6. Then there is ample clearance for the beam 8 in its endwise movement relative to whatever press may be provided at 24 (FIG. 1), and, as previously mentioned, the invention is not limited in its use to presses like those illustrated diagrammatically in FIGS. 4 and 5 but is applicable to equal advantage in fabrication shops, for example, and wherever the chain spreading feature between turnovers of the beam might be advantageous. The dotted line showing of the spreader arms 38 in FIG. 6 is for the purpose of showing that the springs 42, while strong enough to serve the purpose of spreading the chain 10 when it is not under load, as shown in full lines, are weak enough to be stretched to the extent necessary for the arms 38 to assume vertical positions inside the loop of the chain 10 when it is cradling the beam in raising or lowering it or turning it over.

The rearwardly projecting lugs 43 welded to one side of each of the spreader arms 38 in coplanar relationship to lugs 44 rigid with the frame 22 provided convenient points of attachment for the opposite ends of the spring 42, keeping the spring 42 in spaced relationship to the arms 38 in all positions thereof, as clearly seen in FIG. 6. It is also apparent in the full line operative position of the arms in FIG. 6 that they do not in their extreme open position disturb the meshing engagement of the chain with its roller 14, the guides 40 in the outer ends of the arms 38 being sufficiently below the level of the top of the roller 14 to keep the chain in mesh with the roller.

In operation, it should be clear from the foregoing that an I-beam 8 can have one series of punching operations performed on it on the web portion and/or one flange portion while it is supported for endwise movement on the roller equipped conveyor sections 23, using whatever punches are provided at 24 (FIG. 1), and then it is a simple matter to move the beam endwise on the rollers through the spread loops of chains 9, 10 and 11 (FIG. 1) for thereafter first raising the beam by pressing the button 28 to operate gearmotor 17 in one direction, and then turning the beam over through 180° by operating gearmotor 12 using the forward button 30, the reverse button 31 being depressed only if there is a slight overrun in the forward direction, necessitating operation of the gearmotor 13 in the reverse direction to a small extent, after which the button 39 is depressed to operate gearmotor 27 in the opposite direction to lower the beam onto the conveyor rollers again, so that it can be moved endwise in the other direction to punch whatever additional holes are necessary in the web and/or the other flange. The idling chain 11 duplicates whatever turnover operation is given the beam by the power-operated chains 9 and 10.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. In combination with a roller conveyor system adapted for the conveying of steel I-beams and the like endwise by roller support relative to stationary means for performing an operation on a beam, of a plurality of endless chain loops for hoisting a beam and turning it on its longitudinal axis and lowering it again onto the conveyor rollers, said loops being of the same overall length disposed in parallel vertical planes in transverse relationship to and spaced lengthwise of said conveyor system for up and down movement in spaces provided therefor in said conveyor system, a plurality of coaxially arranged pulleys mounted for rotation in supports and profiled circumferentially for meshing engagement with said chains extending thereover and depending therefrom, power means for turning at least two of said pulleys together in either direction for turning over and righting a beam cradled in the lower portions of said loops, hoisting means connected with the pulley supports for raising and lowering the pulleys together as a unit, and chain loop spreader arms associated with each of said pulleys and pivoted at one end on each pulley support and slidably engaging at their other end the inner sides of the chain loop depending therefrom for spreading action when the latter is not under tension cradling an I-beam therein, and spring means normally urging each pair of said arms into diverging relationship to one another.

2. The combination set forth in claim 1 wherein the spreader arms of each pair are so disposed relative to the associated pulley that in the extreme chain loop spreading position the upper portion of the chain remains in full meshing engagement with the pulley.

3. The combination set forth in claim 1 wherein the last mentioned spring means comprises elongated coiled tension springs, one for each spreader arm, connected at one end to the pulley support in spaced relation to the pivoted end of the arm and at the other end to the outer side of the arm intermediate the ends thereof, the arrangement being such that the arms are movable to substantially parallel relationship to the opposite sides of the chain loop when it is under load in hoisting the beam, the springs then being disposed substantially parallel to the outer sides of said arms.

4. The combination set forth in claim 1 wherein the spreader arms of each pair are so disposed relative to the associated pulley that in the extreme chain loop spreading position the upper portion of the chain remains in full meshing engagement with the pulley, and wherein the last mentioned spring means comprises an elongated coiled tension spring, one for each spreader arm, connected at one end to the pulley support in spaced relation to the pivoted end of the arm and at the other end to the outer side of the arm intermediate the ends thereof, the arrangement being such that the arms are movable to substantially parallel relationship to the opposite sides of the chain loop when it is under load in hoisting the beam, the springs then being disposed substantially parallel to the outer sides of said arms.

5. The combination set forth in claim 1 wherein each of the spreader arms is bifurcated and receives the pulley support in the pivoted end of its fork, the other end having chain guide means in its fork slidably engaging the inner side of the chain.

6. The combination set forth in claim 1 wherein each of the spreader arms is bifurcated and receives the pulley support in the pivoted end of its fork, the other end having chain guide means in its fork slidably engaging the inner side of the chain, the spreader arms of each pair being so disposed relative to the associated pulley that in the extreme chain loop spreading position the upper portion of the chain remains in full meshing engagement with the pulley.

7. The combination set forth in claim 1 wherein each of the spreader arms is bifurcated and receives the pulley support in the pivoted end of its fork, the other end having chain guide means in its fork slidably engaging the inner side of the chain, and wherein the last mentioned spring means comprises an elongated coiled tension spring, one for each spreader arm, connected at one end to the pulley support in spaced relation to the pivoted end of the arm and at one other end to the outer side of the arm intermediate the ends thereof, the arrangement being such that the arms are movable to substantially parallel relationship to the opposite sides of the chain loop when it is under load in hoisting the beam, the springs then being disposed substantially parallel to the outer sides of said arms.

8. In combination with a pulley block and a pulley therein over which an endless chain loop is strung for turnover as well as hoisting and lowering of a steel beam or the like cradled in the chain loop, and chain loop spreader means comprising a pair of spreader arms pivoted at one end on said pulley support and slidably engaging at their other end the inner sides of said chain loop for spreading action when the latter is not under tension cradling an I-beam there, and spring means normally urging said arms into diverging relationship to one another.

9. The combination set forth in claim 8 wherein the spreader arms are so disposed relative to the pulley that in the extreme chain loop spreading position the upper portion of the chain remains in full meshing engagement with the pulley, the pulley being profiled circumferentially for meshing engagement with said chain.

10. The combination set forth in claim 8 wherein the last mentioned spring means comprises elongated coiled tension springs, one for each spreader arm, connected at one end to the pulley support in spaced relation to the pivoted end of the arm and at the other end to the outer side of the arm intermediate the ends thereof, the arrangement being such that the arms are movable to substantially parallel relationship to the opposite sides of the chain loop when it is under load in hoisting the beam, the springs then being disposed substantially parallel to the outer sides of said arms.

11. The combination set forth in claim 8 wherein the spreader arms are so disposed relative to the pulley that in the extreme chain loop spreading position the upper portion of the chain remains in full meshing engagement with the pulley, the pulley being profiled circumferentially for meshing engagement with said chain, and wherein the last mentioned spring means comprises an elongated coiled tension spring, one for each spreader arm, connected at one end to the pulley support in spaced relation to the pivoted end of the arm and at the other end to the outer side of the arm intermediate the ends thereof, the arrangement being such that the arms are movable to substantially parallel relationship to the opposite sides of the chain loop when it is under load in hoisting the beam, the springs then being disposed substantially parallel to the outer sides of said arms.

12. The combination set forth in claim 8 wherein each of the spreader arms is bifurcated and receives the pulley support in the pivoted end of its fork, the other end having chain guide means in its fork slidably engaging the inner side of the chain.

13. The combination set forth in claim 8 wherein each of the spreader arms is bifurcated and receives the pulley support in the pivoted end of its fork, the other end having chain guide means in its fork slidably engaging the inner side of the chain, the spreader arms of each pair being so disposed relative to the associated pulley that in the extreme chain loop spreading position the upper portion of the chain remains in full meshing engagement with the pulley.

14. The combination set forth in claim 8 wherein each of the spreader arms is bifurcated and receives the pulley support in the pivoted end of its fork, the other end having chain guide means in its fork slidably engaging the inner side of the chain, and wherein the last mentioned spring means comprises an elongated coiled tension spring, one for each spreader arm, connected at one end to the pulley support in spaced relation to the pivoted end of the arm and at the other end to the outer side of the arm intermediate the ends thereof, the arrangement being such that the arms are movable to substantially parallel relationship to the opposite sides of the chain loop when it is under load in hoisting the beam, the springs then being disposed substantially parallel to the outer sides of said arms.

* * * * *